United States Patent
Ramanathan et al.

(10) Patent No.: US 9,100,213 B1
(45) Date of Patent: Aug. 4, 2015

(54) SYNCHRONIZING VPLS GATEWAY MAC ADDRESSES

(75) Inventors: Ramasamy Ramanathan, Santa Clara, CA (US); Pankaj Shukla, San Jose, CA (US); Sunesh Rustagi, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1092 days.

(21) Appl. No.: 13/156,214

(22) Filed: Jun. 8, 2011

(51) Int. Cl.
  *H04L 12/46* (2006.01)
  *H04L 12/54* (2013.01)
  *H04L 29/12* (2006.01)
  *H04L 12/721* (2013.01)

(52) U.S. Cl.
  CPC ......... *H04L 12/4641* (2013.01); *H04L 12/5689* (2013.01); *H04L 12/5696* (2013.01); *H04L 29/12839* (2013.01); *H04L 45/66* (2013.01); *H04L 61/6022* (2013.01); *H04L 2012/4629* (2013.01)

(58) Field of Classification Search
  CPC ............ H04L 12/4641; H04L 12/5689; H04L 12/5696; H04L 29/12839; H04L 45/66; H04L 61/6022; H04L 2012/4629
  See application file for complete search history.

(56) References Cited

U.S. PATENT DOCUMENTS

| | | | |
|---|---|---|---|
| 5,600,642 A | 2/1997 | Pauwels et al. | |
| 6,256,314 B1 * | 7/2001 | Rodrig et al. | 370/401 |
| 6,374,303 B1 | 4/2002 | Armitage et al. | |
| 6,493,349 B1 | 12/2002 | Casey | |
| 6,501,754 B1 | 12/2002 | Ohba et al. | |
| 6,731,652 B2 | 5/2004 | Ramfelt et al. | |
| 6,751,218 B1 | 6/2004 | Hagirahim et al. | |
| 6,778,531 B1 | 8/2004 | Kodialam et al. | |
| 6,807,182 B1 | 10/2004 | Dolphin et al. | |
| 6,879,594 B1 | 4/2005 | Lee et al. | |
| 7,035,226 B2 | 4/2006 | Enoki et al. | |

(Continued)

FOREIGN PATENT DOCUMENTS

| | | |
|---|---|---|
| KR | 2004001206 | 1/2004 |
| WO | 2004071032 A1 | 8/2004 |

OTHER PUBLICATIONS

Final Office Action from U.S. Appl. No. 13/437,524, dated Apr. 18, 2014, 10 pp.

(Continued)

*Primary Examiner* — Luat Phung
*Assistant Examiner* — Kai Chang
(74) *Attorney, Agent, or Firm* — Shumaker & Sieffert, P.A.

(57) ABSTRACT

In general, techniques are described for synchronizing gateway layer two (L2) addresses of routers that cooperate to provide interconnectivity to multiple, separate L2 networks. In one example, a router includes a VPLS module that establishes a VPLS instance to provide L2 connectivity between a local L2 network for the router and a remote L2 network for the router, wherein the router is addressable by a gateway L2 address. A synchronization module receives a gateway L2 address synchronization message that includes an additional gateway L2 address for an additional router. An integrated routing and bridging (IRB) interface of the router receives a L2 PDU from the local L2 network on an attachment circuit for the VPLS instance attached to the interface card, and a forwarding unit routes a layer three (L3) packet carried by the PDU when the PDU has an L2 destination address that matches the additional gateway L2 address.

21 Claims, 5 Drawing Sheets

(56) References Cited

U.S. PATENT DOCUMENTS

| | | |
|---|---|---|
| 7,082,102 B1 | 7/2006 | Wright |
| 7,095,738 B1 | 8/2006 | Desanti |
| 7,133,928 B2 | 11/2006 | McCanne |
| 7,221,675 B2 | 5/2007 | Bryden et al. |
| 7,269,135 B2 | 9/2007 | Frick et al. |
| 7,281,058 B1 | 10/2007 | Shepherd et al. |
| 7,283,534 B1* | 10/2007 | Kelly et al. .............. 370/395.54 |
| 7,286,479 B2 | 10/2007 | Bragg |
| 7,333,491 B2 | 2/2008 | Chen et al. |
| 7,333,509 B1 | 2/2008 | Gadagottu |
| 7,359,328 B1 | 4/2008 | Allan |
| 7,359,989 B2 | 4/2008 | Orava et al. |
| 7,420,988 B1 | 9/2008 | Grossman |
| 7,715,310 B1* | 5/2010 | Sajassi et al. ................. 370/219 |
| 7,856,509 B1 | 12/2010 | Kodeboyina |
| 7,881,311 B2* | 2/2011 | Sakamoto et al. ............. 370/401 |
| 8,064,465 B2* | 11/2011 | Deguchi et al. ............ 370/395.6 |
| 8,077,732 B2* | 12/2011 | Voit et al. ....................... 370/401 |
| 8,151,000 B1 | 4/2012 | Kodeboyina |
| 8,880,727 B1* | 11/2014 | Kodeboyina ................. 709/238 |
| 8,937,950 B2* | 1/2015 | Dunbar et al. ................. 370/392 |
| 2002/0071390 A1 | 6/2002 | Reeves et al. |
| 2002/0181477 A1 | 12/2002 | Mo et al. |
| 2003/0012215 A1 | 1/2003 | Novaes |
| 2003/0088696 A1 | 5/2003 | McCanne |
| 2003/0099235 A1 | 5/2003 | Shin et al. |
| 2003/0108051 A1* | 6/2003 | Bryden et al. ........... 370/395.54 |
| 2003/0112748 A1 | 6/2003 | Puppa et al. |
| 2003/0131131 A1* | 7/2003 | Yamada et al. ............... 709/238 |
| 2003/0177221 A1 | 9/2003 | Ould-Brahim et al. |
| 2003/0191937 A1 | 10/2003 | Balissat et al. |
| 2004/0037279 A1 | 2/2004 | Zelig et al. |
| 2004/0151181 A1 | 8/2004 | Chu et al. |
| 2004/0165600 A1 | 8/2004 | Lee |
| 2004/0190517 A1 | 9/2004 | Gupta et al. |
| 2004/0196827 A1 | 10/2004 | Xu et al. |
| 2004/0202171 A1* | 10/2004 | Hama ......................... 370/395.1 |
| 2004/0218536 A1 | 11/2004 | Yasukawa et al. |
| 2004/0218539 A1 | 11/2004 | Anqud et al. |
| 2004/0223500 A1 | 11/2004 | Sanderson et al. |
| 2005/0027782 A1 | 2/2005 | Jalan et al. |
| 2005/0044262 A1 | 2/2005 | Luo |
| 2005/0047329 A1* | 3/2005 | Almog et al. ................. 370/225 |
| 2005/0097203 A1 | 5/2005 | Unbehagen et al. |
| 2005/0108419 A1 | 5/2005 | Eubanks |
| 2005/0111351 A1 | 5/2005 | Shen |
| 2005/0169270 A1* | 8/2005 | Mutou et al. ................... 370/390 |
| 2005/0213513 A1 | 9/2005 | Ngo et al. |
| 2005/0262232 A1 | 11/2005 | Cuervo et al. |
| 2005/0281192 A1 | 12/2005 | Nadeau et al. |
| 2006/0013141 A1 | 1/2006 | Mutoh et al. |
| 2006/0039364 A1 | 2/2006 | Wright |
| 2006/0047851 A1 | 3/2006 | Voit et al. |
| 2006/0147204 A1 | 7/2006 | Yasukawa et al. |
| 2006/0153067 A1 | 7/2006 | Vasseur et al. |
| 2006/0159100 A1* | 7/2006 | Droms et al. ............... 370/395.2 |
| 2006/0182120 A1* | 8/2006 | Lee ........................... 370/395.53 |
| 2006/0190570 A1* | 8/2006 | Booth et al. ................... 709/220 |
| 2007/0036162 A1 | 2/2007 | Tingle et al. |
| 2007/0086361 A1* | 4/2007 | Allan et al. .................... 370/254 |
| 2007/0110048 A1* | 5/2007 | Voit et al. ....................... 370/389 |
| 2007/0253432 A1* | 11/2007 | Regale et al. ............. 370/395.53 |
| 2008/0123654 A1 | 5/2008 | Tse-Au |
| 2008/0170578 A1* | 7/2008 | Ould-Brahim ................. 370/401 |
| 2009/0168666 A1* | 7/2009 | Unbehagen et al. ........... 370/254 |
| 2010/0080235 A1* | 4/2010 | Yamate et al. .............. 370/395.31 |
| 2010/0284308 A1* | 11/2010 | Lv ................................. 370/254 |
| 2011/0019654 A1* | 1/2011 | Harmatos et al. ............. 370/338 |
| 2011/0116509 A1* | 5/2011 | Moreno et al. ................. 370/401 |
| 2011/0176544 A1* | 7/2011 | Wong et al. ................... 370/390 |
| 2012/0033669 A1* | 2/2012 | Mohandas et al. ............. 370/392 |
| 2012/0147894 A1* | 6/2012 | Mulligan et al. ........... 370/395.53 |
| 2012/0182866 A1* | 7/2012 | Vinayagam et al. ........... 370/228 |
| 2012/0236734 A1* | 9/2012 | Sampath et al. ............... 370/252 |
| 2012/0263183 A1* | 10/2012 | Weill et al. ................ 370/395.53 |
| 2013/0073711 A1* | 3/2013 | Hanka et al. ................... 709/223 |
| 2013/0145045 A1* | 6/2013 | Eastlake, III .................. 709/245 |

OTHER PUBLICATIONS

Lasserre, Kompella et al. "Virtual Private LAN Services over MPLS," draft-ietf-ppvpn-vpls-ldp-00.tx, Jun. 2003, 26 pp.

"A Comparative Overview of Frame Relay and ATM," Sprint Technical Report, Jun. 2001, 10 pp.

King, K. "Real-World ATM," Oct. 19, 2001, 10 pp.

King, K., "Understanding the Big ATM Picture," Oct. 19, 2001, 16 pp.

Aggarwal et al., "Establishing Point to Multipoint MPLS TE LSPs," submitted to Internet Engineering Task Force (IETF) Feb. 11, 2007, pp. 1-15.

Atlas et al., "MPLS RSVP-TE Interoperability for Local Protection/ Fast Reroute," IETF, Jul. 2001, pp. 1-14.

B. Zhang and H. Mouftah, "A Destination-initiated Multicast Routing Protocol for Shortest Path Tree Constructions," Globecom 2003, IEEE Global Telecommunications Conference, XP010677629, pp. 2840-2844, 2003.

Awduche, D., et al., "RFC 3209—RSVP-TE: Extensions to RSVP for LSP Tunnels," Network Working Group, Dec. 2001, 64 pgs. http://rfc.sunsite.dk/rfc/rfc3209html.

Rosen, E., et al., "Multicast in MPLS/BGP IP VPNs," draft-rosen-vpn-mcast-07.txt, May 2004, 27 pgs.

Kompella, K., et al., "Virtual Private LAN Service," draft-ietf-l2vpn-vpls-bgp-00.txt, May 2003, 22 pgs.

Lasserre, V., et al., "Virtual Private LAN Services over MPLS," draft-ietf-l2vpn-vpls-ldp-00.txt, Jun. 2003.

RSVP-TE: Resource Reservation Protocol—Traffic Extension, Javvin Company, 2 pgs, printed Apr. 18, 2005. http://www.javvin.com/protocolRSVPTE.html.

Deering, S. et al., "Independent Multicast-Sparse Mode (PIM-SM): Motivation and Architecture," draft-ietf-idmr-pim-arch-05.txt, Aug. 4, 1998, 30 pgs.

Rekhter, Y. et al., "A Border Gateway Protocol 4 (BGP-4)," Mar. 1995, 72 pgs.

Yasukawa et al. "Requirements for Point to Multipoint extension to RSVP-TE," IETF, Oct. 2003, pp. 1-20.

Zimmermann, "OSI Reference Model—The ISO Model of Architecture for Open Systems Interconnection," IEEE Transactions on Communications, vol. 28, No. 4, Apr. 1980, pp. 425-432.

Andersson et al., RFC 4664, "Framework for Layer 2 Virtual Private Networks (L2VPNs)," Network Working Group, Sep. 2006, 45 pp.

Bryant et al., RFC 3985, "Pseudo Wire Emulation Edge-to-Edge (PWE3) Architecture," Mar. 2005, 40 pp.

Knight et al., RFC 2338, "Virtual Router Redundancy Protocol," Apr. 1998, 26 pp.

Kompella et al., RFC 4761, "Virtual Private LAN Service (VPLS) Using Border Gateway Protocol (BGP) for Auto-Discovery and Signaling," Jan. 2007, 29 pp.

Lasserre et al., RFC 4762, "Virtual Private LAN Service (VPLS) Using Label Distribution Protocol (LDP) Signaling," Jan. 2007, 32 pp.

U.S. Appl. No. 12/973,559, by Chaitanya Kodeboyina, filed Dec. 20, 2010.

Juniper® Networks white paper, "Solutions for Deploying Server Virtualization in Data Center Networks," Feb. 2011, 14 pp.

Juniper® Networks white paper, "Implementing VMWare Server Virtualization on Juniper Networks Infrastructure," Oct. 2009, 28 pp.

Juniper® Networks white paper, "Implementing VPLS for Data Center Interconnectivity," Jan. 2011, 47 pp.

* cited by examiner

SYNCHRONIZING VPLS GATEWAY MAC ADDRESSES

TECHNICAL FIELD

The invention relates to computer networks and, more specifically, to network routing and bridging.

BACKGROUND

Networks that primarily utilize data link layer devices are often referred to as layer two (L2) networks. A data link layer device is a device that operates within the second layer of the Open Systems Interconnection (OSI) reference model, i.e., the data link layer. One example of a common L2 networks is an Ethernet network in which end point devices (e.g., servers, printers, computers) are connected by one or more Ethernet switches or other L2 network devices. The Ethernet switches forward Ethernet frames, also referred to as L2 communications or L2 packets to devices within the network. As the Ethernet switches forward the Ethernet frames the Ethernet switches learn L2 state information for the L2 network, including media access control (MAC) addressing information for the devices within the network and the physical ports through which the devices are reachable. The Ethernet switches typically store the MAC addressing information in MAC tables associated with each of their physical interfaces. When forwarding an individual Ethernet frame, an ingress port of an Ethernet switch typically multicasts the Ethernet frame to all of the other physical ports of the switch unless the Ethernet switch has learned the specific physical port through which the destination MAC address devices is reachable. In this case, the Ethernet switch forwards a single copy of the Ethernet frame out the associated physical port.

Some layer three (L3) networks that route communications at the third layer of the Open Systems Interconnection (OSI) reference model, i.e., the network layer, employ L3 network devices that also perform L2 functionality to bridge and switch L2 communications to other L3/L2 and L2 network devices within the networks. One mechanism by which network service providers that operate L3 networks provide L2 connectivity to their customers is by use of a virtual private local area network service (VPLS). A customer-specific VPLS instance transports layer two (L2) communications, such as Ethernet packets, between customer network sites through the service provider network core. In a typical configuration, provide edge (PE) routers coupled to the customer network sites define label switched paths (LSPs) that may be used to carry pseudowires that carry encapsulated L2 communications within the provider network as if the customer network sites were directly attached to the same local area network (LAN). Each of the PE routers operates as a virtual L2 switch having customer- and core-facing interfaces to connect the multiple LAN segments of an overall customer network defined by the individual customer network sites.

SUMMARY

In general, techniques are described for synchronizing gateway L2 addresses that identify routable traffic to L3 devices, such as PE routers, that cooperate to provide L2 interconnectivity to multiple, separate customer networks, and further operate as respective gateways for the customer networks to an L3 network, such as the Internet. In other words, the L3 devices provide L2 interconnectivity and further provide an L3 routed interface for providing L3 connectivity to the external L3 network. In one example, PE routers that are members of a virtual private LAN service (VPLS) instance utilize an extended routing protocol or distribution protocol to distribute their respective gateway L2 addresses for the service to one another. Upon receiving a gateway L2 address from another PE router, a PE router adds the gateway L2 address to a list of gateway L2 addresses. Upon receiving, on an attachment circuit for the VPLS instance, L2 packet data units (PDUs) from a customer network that have a destination L2 address included in the list of gateway L2 addresses, the PE router diverts the PDUs to a routing instance associated with the VPLS instance, and the PE router then forwards the L3 traffic received in the PDUs in accordance with the routing instance.

The techniques may provide one or more advantages. For example, the techniques may be useful in systems that include hosts (e.g., end-user devices) that frequently migrate among PE routers providing L2 interconnectivity to multiple, separate customer networks that include the hosts. In such systems, a migrated host may continue using a gateway L2 address previously configured or otherwise learned by the host prior to migration without the traffic being directed to a routed interface of a once local but now remote PE router of the VPLS instance. In contrast to conventional systems, each of the PE routers within the VPLS instance is informed of the gateway L2 addresses for other participating PE routers. Regardless of the particular gateway L2 address of any of the participating PE routers used by a host in the system for L2 traffic, the local PE router that receives the L2 traffic from the migrated host at the service edge may classify the packets therein as L3 packets and divert the L3 packets to a local routing instance for processing and communication to an external network. As a result, the local PE router may avoid switching the L2 traffic to a remote PE router having the gateway L2 address specified as the L2 destination address of the L2 traffic, thereby reducing L2 traffic in the service core. Moreover, an administrator may avoid manually reconfiguring the migrated host to begin using the gateway L2 address of the serving PE router (i.e., the PE router that receives the L2 traffic from the host at the service edge) for L3 traffic destined for an external network. In addition, the hosts may avoid executing a L2 learning protocol on the host to learn a gateway L2 address for the access gateway of the host to the service.

In one example, a method comprises establishing, with a router, a layer two virtual private networking (L2VPN) instance to provide L2 connectivity between a local L2 network for the router and a remote L2 network for the router, wherein the router is addressable by a gateway L2 address for the L2VPN instance. The method further comprises receiving, with the router, a first gateway L2 address synchronization message that specifies a gateway L2 address for a second router of the L2VPN instance. The method also comprises receiving a L2 PDU with the router from the local L2 network on a service interface for the L2VPN instance. The method further comprises routing, with the router, a layer three (L3) packet carried by the PDU to an L3 network external to the L2VPN instance when the PDU has an L2 destination address that matches the second gateway L2 address.

In another example, a router comprises a control unit comprising a processor, an interface card, and a virtual private local area network (LAN) service (VPLS) module of the control unit that establishes a layer two (L2) virtual private networking (L2VPN) instance to provide L2 connectivity between a local L2 network for the router and a remote L2 network for the router, wherein the router is addressable by a gateway L2 address for the L2VPN instance. The router also comprises a synchronization module of the control unit that receives a first gateway L2 address synchronization message that specifies a gateway L2 address for a second router of the L2VPN instance. The router also comprises an integrated routing and bridging (IRB) interface that receives a L2 PDU from the local L2 network on an attachment circuit for the L2VPN instance attached to the interface card. The router further comprises a forwarding unit that routes a layer three (L3) packet carried by the PDU to an L3 network external to the L2VPN instance when the PDU has an L2 destination address that matches the gateway L2 address for the additional router of the L2VPN instance.

In another embodiment, the invention is directed to a non-transitory computer-readable medium containing instructions. The instructions cause one or more programmable processors to establish, with a router, a layer two virtual private networking (L2VPN) instance to provide L2 connectivity between a local L2 network for the router and a remote L2 network for the router, wherein the router is addressable by a gateway L2 address for the L2VPN instance. The instructions also cause the processors to receive, with the router, a first gateway L2 address synchronization message that specifies a gateway L2 address for a second router of the L2VPN instance. The instructions further cause the processors to receive a L2 PDU with the router from the local L2 network on a service interface for the L2VPN instance. The instructions further cause the processors to route, with the router, a layer three (L3) packet carried by the PDU to an L3 network external to the L2VPN instance when the PDU has an L2 destination address that matches the second gateway L2 address.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
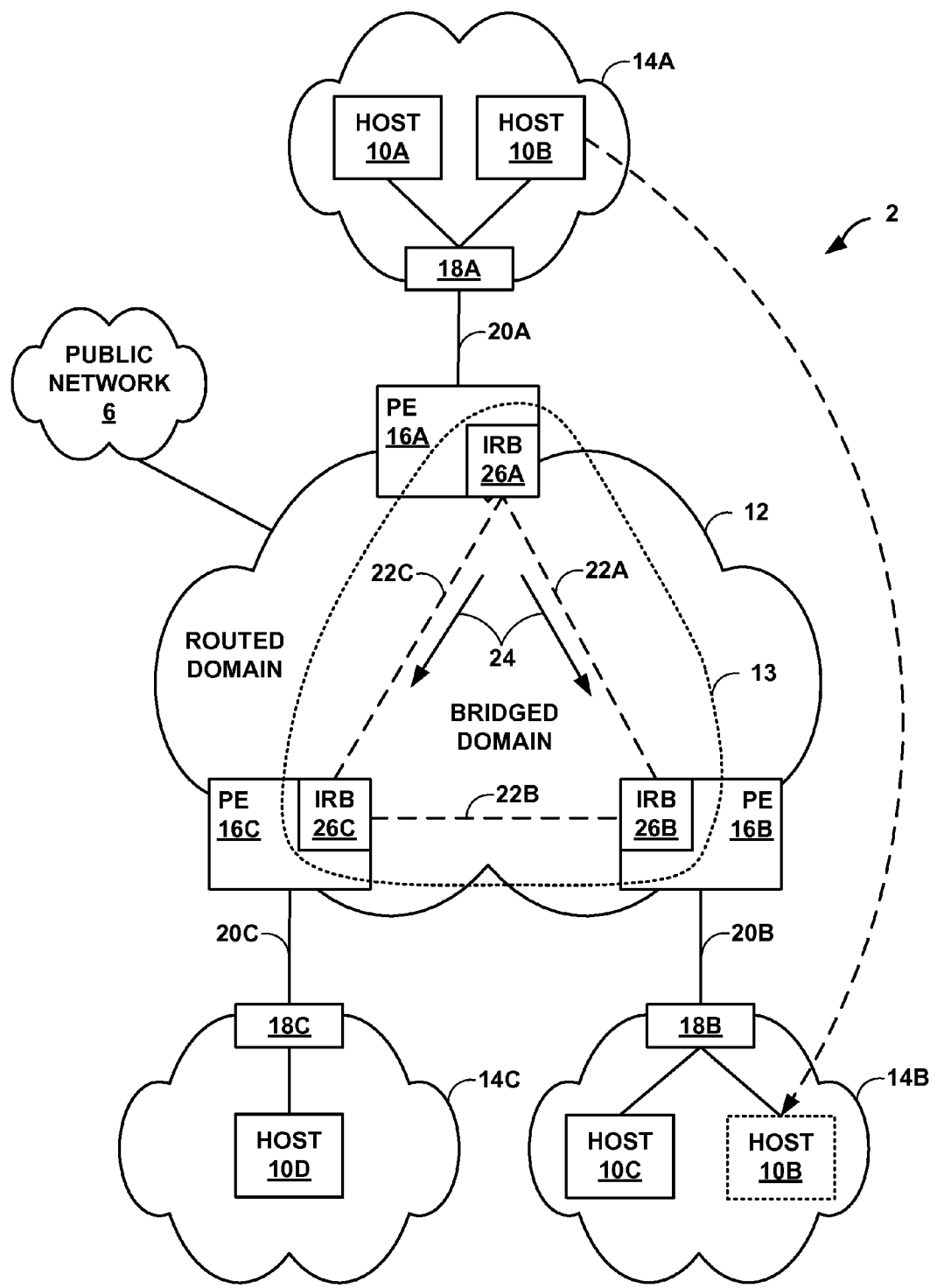
FIG. 1 is a block diagram illustrating an example network system in which one or more network devices synchronize gateway layer two (L2) addresses for identifying routable layer three (L3) traffic for an L2 bridging instance according to techniques described herein.

FIG. 1 is a block diagram illustrating an example network system 2 in which one or more network devices synchronize gateway layer two (L2) addresses for identifying routable layer three (L3) traffic for an L2 bridging instance according to techniques described herein. As shown in FIG. 1, network system 2 includes a packet-switched network 12, public network 6, and customer networks 14A-14C ("customer networks 14"). Network 12 may represent a public network that is owned and operated by a service provider to interconnect a plurality of edge networks, such as customer networks 14. As a result, network 12 may be referred to herein as a Service Provider (SP) network or, alternatively, as a "core network" in that network 12 acts as a core to interconnect access networks that service customer networks 14. Service provider network 12 may comprise a Multi-protocol Label Switching (MPLS) network and alternatively be referred to as an MPLS core or MPLS backbone. Example service providers include Verizon Communications, Inc. or American Telephone & Telegraph (AT&T™) Company. Public network 6 may represent another public network, such as the Internet, an autonomous system (AS) owned and operated by a service provider, or an L3VPN, for instance.

These service providers may lease portions of network 12 or provide switching (or bridging) services offering interconnection through network 12 to customer networks 14, which may lease the portions or purchase the services provided by network 12 to create a Layer 2 Virtual Private Network (L2VPN) interconnecting the various layer 2 (L2) customer networks 14 in a bridging domain. While described herein with respect to a Virtual Private Local Area Network (LAN) Service (VPLS), techniques may also be applied in the context of a Virtual Private Wire Service (VPWS), a collection of virtual circuits, or a virtual leased line (VLL), or another emulation technology that provides L2 emulation as well as L3 connectivity to customer networks. Reference to layers followed by a numeral may refer to a particular layer of the Open Systems Interconnection (OSI) model. More information concerning the OSI model can be found in a IEEE publication entitled "OSI Reference Model—the ISO Model of Architecture for Open Systems Interconnection," by Hubert Zimmermann, published in IEEE Transactions on Communications, vol. 28, no. 4, dated April 1980, which is hereby incorporated by reference as if fully set forth herein. Additional details regarding L2VPNs are found in "Framework for Layer 2 Virtual Private Networks (L2VPNs), Request for Comments: 4664, Internet Engineering Task Force: Network Working Group, September, 2006, which is incorporated by reference herein in its entirety.

In the illustrated instance, network 12 provides a type of L2VPN, a VPLS instance 13 in this example, to transparently interconnect these layer 2 networks, e.g., customer networks 14, to one another via service provider network 12. Network 12 may provide a VPLS instance to a customer by transparently emulating a direct connection between these various customer networks 14 such that, from the perspective of customer networks 14, each of customer networks 14 appears to directly connect to one another. Moreover, different VPLS instances, including corresponding virtual routing and forwarding information (VRFs), may be maintained by routers within network 12.

Customer networks 14 may each represent a network owned and operated by a large entity, such as a university, corporation, business, or other facility or enterprise. In some instances, a single large entity may own and operate two or more of customer networks 14. The entity may then contract with service provider network 12 to use a service offered by service provider network 12, such as VPLS instance 13, in order to transparently interconnect these customer networks 14 in the manner described above.

Each of customer networks 14 may operate according to a wide variety of network protocols, such as any of the 802.3X family of network protocols related to the Ethernet protocol, any of the 802.1X family of wireless networking protocols, an Internet Protocol (IP) protocol, and a Transmission Control Protocol (TCP). Moreover, one or more of customer networks 14 may comprise a Virtual Private Network (VPN), a Large Area Network (LAN), or a Wide Area Network (WAN).

Each of customer networks 14 includes a respective one of a plurality of customer edge (CE) routers 18A-18C ("CEs 18") that reside at an edge of the corresponding one of customer networks 14. Customer edge routers 18, while discussed herein with respect to a particular network device, i.e., a router, may each represent any network device that interfaces with a network, such as service provider network 12, to bridge, switch or otherwise forward network traffic directed to or originating from the network. For example, CEs 18 may each represent, in certain instances, one or more of an access layer switch, a hub, a bridge device (e.g., an Ethernet bridge), or any other L2 network device and, in some instances, L3 network devices capable of performing L2 functionality.

Each of customer networks 14 may include a wide variety of interconnected computing devices or nodes, such as web servers, print servers, application servers, data servers, workstations, desktop computers, laptop computers, cellular or other mobile devices, Personal Digital Assistants (PDAs), and any other device cable of connecting to a computer network via a wireless and/or wired connection. In the illustrated example, each of customer networks 14 includes one or more of hosts 10A-10D ("hosts 10") that communicate with one another using the L2VPN provided by service provider network 12. Each of hosts 10 may represent any of the computing devices mentioned above.

In some instances, customer networks 14 represent data center locations for an enterprise data center providing geographically disperse servers, applications, and storage services. In such instances, each of hosts 10 may represent a single physical or a single virtual server of the enterprise data center. Any of hosts 10 may reside on or a represent single physical device of one of customer networks 14, however, such hosts are not bound to any physical device and may migrate from one customer network 14 to another. In the illustrated example, host 10B migrates from customer network 14A to customer network 14B. In the case of physical hosts, migration connotes the physical movement of the host from one network to another. In the case of virtual hosts that conform to a scheme of server virtualization, however, a host may migrate using live server migration from one customer network 14 to another by transferring data and instructions that constitute the host over SP network 12 using VPLS instance 13. Because server virtualization requires local switching between different virtual server machines within the same physical server, the network access layer may be implemented within the physical server and each virtual server may have a separate L2 address unique at least within VPLS instance 13. Examples of commercially available server virtualization implementations include Microsoft Virtual Server available from Microsoft Corp., VMware Infrastructure available from VMware, Inc., and XenServer available from Citrix Systems, Inc.

Network 12 includes a plurality of provider edge (PE) routers 16A-16C ("PEs 16") that reside at an edge of service provider network 12. While discussed herein with respect to a particular network device, i.e., a router, PEs 16 may each represent any network device that interfaces with a network, such as one of customer networks 14, to route, switch, bridge or otherwise forward network traffic directed to or originating from the network. For example, PEs 16 may each represent, in certain instances, one or more of a switch, a hub, a bridge device (e.g., an Ethernet bridge), or any other L2 network device and, in some instances, L3 network devices capable of performing L2 functionality. For a particular one of PE routers 16, a customer network 14 that connects to the PE router via an attachment circuit is local to the PE router. For example, customer network 14A is local to PE router 16A, while customer networks 14B, 14C are remote to PE router 16A.

PEs 16 couple to respective CEs 18 of customer networks 14 via attachment circuits 20A-20C ("ACs 20"). Each of ACs 20 is a physical or virtual circuit attaching a CEs 18 to one of PEs 16 and may be, for example, a Frame Relay data link connection identifier, an asynchronous transfer mode (ATM) Virtual Path Identifier (VPI)/Virtual Channel Identifier (VCI), an Ethernet port, a VLAN, a Point-to-Point Protocol (PPP) connection on a physical interface, a PPP session from an L2 Tunneling Protocol (L2TP) tunnel, or a Multiprotocol Label Switching (MPLS) Label Switched Path (LSP), a Generic Route Encapsulation (GRE) tunnel, or another interface with bridged encapsulation. Attachment circuits 20 may each comprise a direct link or an access network.

PEs 16 may provide one or more services, such as the above described VPLS instance, to transparently interconnect CEs 18 to one another. To continue the above example, the large entity may own and operate each of customer networks 14 and purchase VPLS instance 13 from the service provider to transparently interconnect each of these CEs 18 to one another via service provider network 12. In this case, PE 16A may emulate a direct connection in accordance with the VPLS instance to both of CEs 18B, 18C such that these CE routers may operate as if both directly connected to CE 18A. Likewise, PE 16B may emulate a direct connection in accordance with VPLS instance 13 to both of CEs 18A, 18C such that these customer network may operate as if both directly connected to CE 18B. In some instances, one or more of CEs 18 may comprise or otherwise operate as a L2 bridge between associated customer networks 14 and connected PEs 16. In such instances, PEs 16 implementing VPLS instance 13 "learn" multiple source L2 addresses of additional devices within the customer networks 14 from the bridging CEs 18. The techniques described herein may apply with respect to these multiple source L2 addresses in addition to, or instead of, to the learned source L2 addresses of CEs 18.

This form of interconnection is referred to as "full mesh" in that a VPLS provides logical point-to-point connectivity between each of a set of CEs 18 and associated customer networks 14. The full mesh form of interconnection is illustrated in FIG. 1 as three bi-directional service links 22A-22C ("service links 22") that transport customer L2 packet data units (PDUs) between PEs 16. Service links 22 are illustrated in FIG. 1 as dashed lines to reflect that these may not directly couple PEs 16 to one another with a single physical link, but may transport PDUs over one or more physical links and intermediate network devices that form each of service links 22. While assumed for ease of illustration purposes to be configured in this full mesh manner, CEs 18 may interconnect with one another via any other form of interconnection, and service links 22 may be bi-directional or unidirectional to suit any particular form of interconnection. Each of service links 22 may be implemented as a pseudowire. Pseudowire service emulation is described in additional detail in "Pseudo Wire Emulation Edge-to-Edge (PWE3) Architecture," Request for Comments: 3985, Network Working Group (Bryant and Pate, ed.), March, 2005, which is hereby incorporated by reference as if fully set forth herein.

An administrator of service provider network 12 may configure or PEs 16 may cooperatively establish service links 22 for VPLS instance 13, and once established, PEs 16 begin emulating the direct connection between customer networks 14 using service links 22, thus implementing an emulated service that terminates at the customer edges. Each of PEs 16 includes a respective one of integrated routing and bridging instances 26A-26C ("IRBs 26") that connects attachment circuits 20 and service links 22 for the VPLS instance at PEs 16 and additionally connects attachment circuits to a routed domain that includes public network 6. IRBs 26 thus includes both a bridging instance that includes L2 learning tables for VPLS instance 13 (an example of a "bridging instance") at the respective PE 16, as well as a routing instance mapped to VPLS instance 13. IRBs 26 therefore act as an L3 routing interfaces for a bridge domain, e.g., VPLS instance 13, in which respective PEs 16 participate. In this way, each of IRBs 26 provide simultaneous support for L2 bridging and L3 routing on a single interface with respective attachment circuits 20 for respective PEs 16. For example, IRB 26A provides L2/L3 support on the single interface to attachment circuit 20A coupled to PE 16A.

A "routing instance" is a routing entity for a router that provides L3 routing functionality and may be used to create administrative separation in a large network to segregate customer traffic such that customers advertise/receive only customer routes and/or to create overlay networks in which PE routers 16 route separate services (e.g., voice) only towards routers participating in that service. A routing instance includes a routing table or other structure storing routes to destinations, e.g., IP prefixes, routing policies, interfaces that belong to the routing instance, and protocol configurations (e.g., an Open Shortest Path First (OSPF) configuration). Routing instances may include routes for public network 6 and destinations within SP network 12, for example. The routing instance of any of IRBs 26, and therefore associated with VPLS instance 13, may be part of the main routing table for the respective PE router 16 or, alternatively, may be associated with a virtual router that executes a routing instance for the IRB.

In one example of a virtual router, each of PEs 16 represents two or more physical routers configured, as a group, to operate a virtual router to provide L2 connectivity and provide a gateway to an L3 network for respective customer networks 14. However, only one of the physical routers, the "master router," is actively routing packets at any time. The additional physical routers are "standby" or "backup" routers that may switch to assume master router status and to actively route packets and generally provide L3 routing functions for the VPN service as the virtual router upon a failure of the current master router for the VPN service.

To continue the example, the master router operating as the gateway for the VPLS service uses an L2 address, e.g., a Media Access Control (MAC) address, for the virtual router that is typically different than the MAC address of any of the group of physical routers. In other words, the master router receives L2 datagrams destined for the L2 address for the virtual router, sources L2 datagrams with the L2 address of the virtual router, and replies to Address Resolution Protocol (ARP) requests to the virtual router IP address with the L2 address of the virtual router. The L2 address for a virtual router is also different than any other virtual router in network system 2. In the illustrated example, the L2 address for the virtual router, operated by one of PEs 16 and having a routing interface mapped to the corresponding one of IRBs 26, is the L2 address of the PE router at the IRB interface. For example, PE 16A operates a virtual router having a routing interface mapped to IRB 26A. Packet data units from customer network 14 destined for the L2 address of the virtual router and received on attachment circuit 20A are received by the virtual router for processing, e.g., with the routing interface of the virtual router. In some instances, a master router for a virtual router specifies a MAC address that conforms to 00-00-5E-00-01-XX, where XX is populated with a Virtual Router IDentifier (VRID) unique among virtual routers of network system 2. In some aspect, the two or more physical routers of any one or more of PEs 16 execute Virtual Router Redundancy Protocol (VRRP) to perform the techniques described above. One example of VRRP is described in Knight et al., "Virtual Router Redundancy Protocol," Request for Comments: 2338, Network Working Group, April 1998, which is incorporated herein by reference in its entirety.

Provider edge routers 16 either route or switch L2 traffic arriving on respective attachment circuits 20 according to the destination address of the L2 traffic. In accordance with techniques of this disclosure, PEs 16 synchronize (e.g., exchange) respective gateway layer two (L2) addresses for identifying routable L3 traffic for VPLS instance 13 within respective IRBs 26. In the illustrated example, PE 16A sends a gateway L2 address synchronization message 24 (hereinafter, "synchronization message 24") to each of PEs 16B, 16C that are also members of VPLS instance 13. Synchronization messages 24 each specify the gateway L2 address of PE 16A for the VPLS service, which may be the MAC address of PE 16A, the MAC address of an interface of PE 16A that couples to attachment circuit 20A, or any other L2 address that PE 16A uses to classify PDUs arriving on an L2 interface of the PE router as L3 traffic.

Upon receiving synchronization message 24, PEs 16B, 16C install the included gateway L2 address(es) to respective IRBs 26B, 26C and map the routing instance for the IRB to the gateway L2 address for PE 16A. For example, PEs 16B, 16C may install the included gateway L2 address(es) as a local router L2 address for the bridge domain, e.g., VPLS instance 13. As a result, PEs 16B, 16C in effect each associate the gateway L2 address(es) with its respective one of IRBs 26B, 26C that is associated with the bridge domain. While not illustrated in FIG. 1, PEs 16B, 16C also send synchronization messages 24 to advertise their respective gateway L2 address for VPLS instance 13. Each of the PEs 16 thus receives a gateway L2 address in synchronization messages 24 for each of the other PEs 16 that is a member of VPLS instance 13 and installs the gateway L2 address to its IRB interface.

As a result, each of PEs 16 may have multiple gateway L2 addresses, each corresponding to the gateway L2 address of PEs 16 that are members of VPLS instance 13, installed within its forwarding information for its IRB interface. For example, PE router 16B has respective gateway L2 addresses for PE 16A, 16C installed to IRB 26B and mapped to the routing instance associated with the IRB interface. Upon receiving L2 traffic on attachment circuits 20 and destined for any of the gateway L2 addresses installed to its respective IRB 26, PEs 16 classifies the L2 traffic as L3 traffic and routes the L3 traffic according to the routing instance associated with the IRB 26. PEs 16 use respective IRBs 26 to switch L2 traffic received by from one of hosts 10 that specifies a non-gateway L2 address, e.g., an L2 address of another one of hosts 10, in accordance with VPLS instance 13.

In the illustrated example, host 10B is configured to send traffic for L3 routing to the gateway L2 address of PE 16A. After host 10B migrates to customer network 14B connected via attachment circuit 20B to PE 16B, host 10B continues to send traffic for L3 routing to the gateway L2 address of PE 16A. CE device 18B switches such traffic to PE 16B. IRB 26B includes the installed gateway L2 address of PE 16A, received in one of synchronization messages, mapped to the routing instance in IRB 26B. PE 16B, which identifies the destination L2 address of the traffic as one of the installed gateway L2 addresses, routes such traffic in accordance with the routing instance associated with IRB 26B. As a result, PE 16B avoids switching the traffic to PE 16A, i.e., the PE router having the destination L2 address of the traffic, by identifying the traffic at its own IRB 26B. In this way, the techniques may avoid unnecessarily switching traffic across the VPLS core while also avoiding the need to reconfigure migrated hosts, such as host 10B, to use a new gateway L2 address for L3 routing. Rather, by leveraging techniques described herein, each of hosts 10 may maintain a configuration of sending traffic for L3 routing to a particular one of PEs 16 while migrating among customer networks 14 in accordance with server virtualization techniques, for example.

Figure 2:
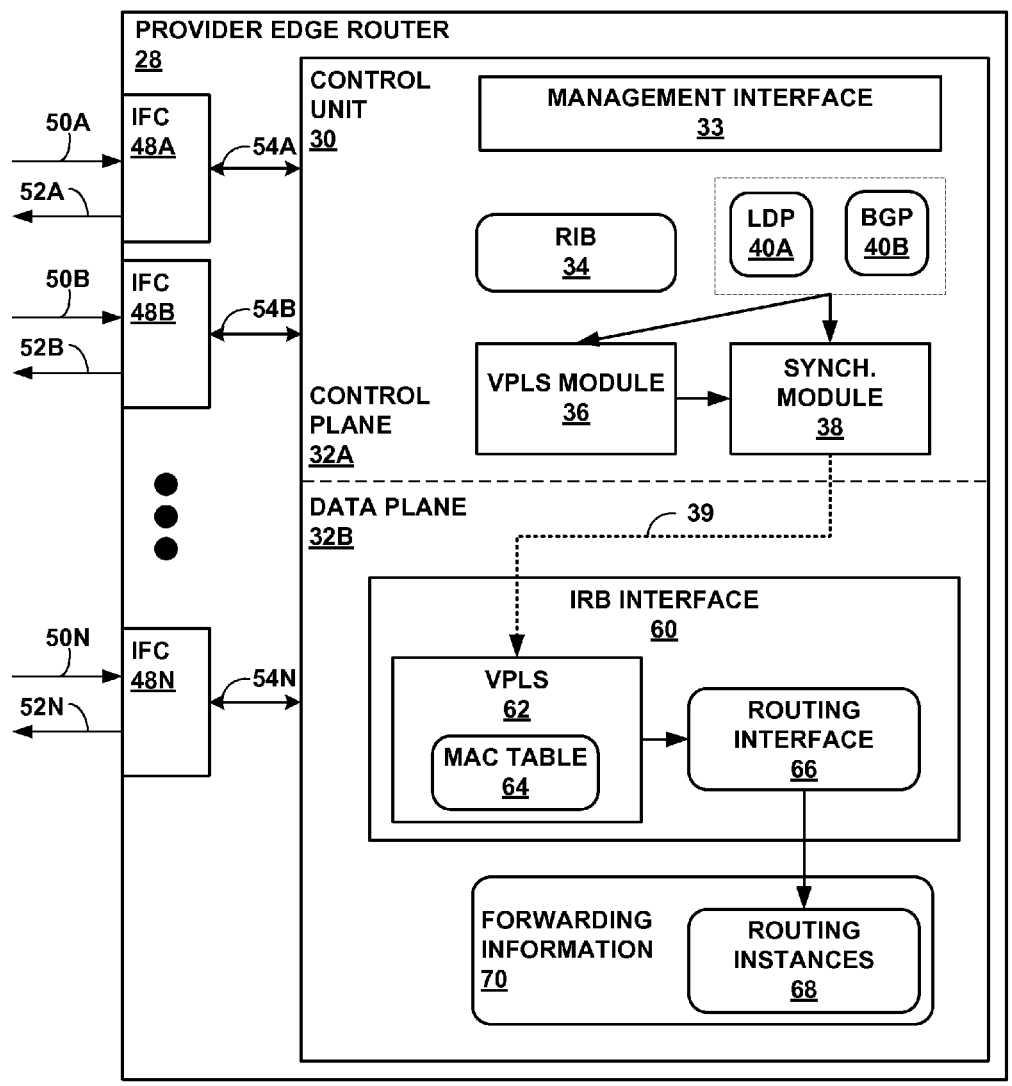
FIG. 2 is a block diagram illustrating example network device that emulates service traffic in the context of a virtual private LAN service and exchanges gateway MAC addresses with other network devices for synchronized, integrated routing and bridging in accordance with techniques described in this disclosure.

FIG. 2 is a block diagram illustrating example provider edge router 28 ("router 28") that emulates service traffic in the context of a VPLS instance and exchanges gateway MAC addresses with other PE routers for synchronized, integrated routing and bridging in accordance with techniques described in this disclosure. Reference to a VPLS instance hereinafter may refer to a VPLS instance that is a hierarchical-VPLS (H-VPLS) instance. For purposes of illustration, router 28 may be described below within the context of an exemplary network system 2 of FIG. 1 and may represent any one of PEs 16. Moreover, while described with respect to a particular network device, e.g., a router, the techniques may be implemented by any network device that may operate as a service endpoint or H-VPLS hub router. For example, router 28 may also represent and perform the functionality of a multi-tenant unit (MTU). The techniques should therefore not be limited to the exemplary embodiments described in this disclosure.

Router 28 includes a control unit 30 and interface cards 48A-48N ("IFCs 48") coupled to control unit 30 via internal links 54A-54N. Control unit 30 may comprise one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 30 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In this example, control unit 30 is divided into two logical or physical "planes" to include a first control or routing plane 32A ("control plane 32A") and a second data or forwarding plane 32B ("data plane 32B"). That is, control unit 30 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 32A of control unit 30 executes the routing functionality of router 28. In this respect, control plane 32A represents hardware or a combination of hardware and software of control unit 30 that implements routing protocols (not shown in FIG. 2) by which routing information stored in routing information base 34 ("RIB 34") may be determined. RIB 34 may include information defining a topology of a network, such as SP network 12 of FIG. 1. Control plane 32A may resolve the topology defined by routing information in RIB 34 to select or determine one or more routes through the network. Control plane 32A may then update data plane 32B with these routes, where data plane 32B maintains these routes as forwarding information 70. Forwarding or data plane 32B represents hardware or a combination of hardware and software of control unit 30 that forwards network traffic in accordance with forwarding information 70. RIB 34 may in some aspects comprise one or more routing instances implemented by router 28, with each instance including a separate routing table and other routing information. Control plane 32A in such aspects updates forwarding information 70 with forwarding information for each of routing instances 68. In this respect, routing instance 68 each include separate forwarding information for use by data plane 32B in forwarding traffic in accordance with the corresponding routing instance.

Control plane 32A further includes management interface 33 by which a network management system or in some instances an administrator using a command line or graphical user interface, configures in VPLS module 36 one or more VPLS instances for a network to interconnect combinations of Ethernet customer networks into a single Ethernet domain using pseudowires. For example, an administrator may configure router 28 as a participant in a particular VPLS instance, such as VPLS instance 13 of FIG. 1. VPLS module 32 may perform auto-discovery or other techniques to determine additional PE routers or MTUs participating in a VPLS instance and additionally performing signaling techniques to establish a full mesh of pseudowires between PE 28 and each of the additional PE routers. In the case of an H-VPLS instance, VPLS module 36 may perform signaling to establish one or more spokes and/or one or more hub links with one or more other MTUs and/or routers. Furthermore, while described as establishing and operating a VPLS, VPLS module 36 in various instances may establish and manage any type of L2VPN to provide a L2 emulation service that offers L2 interconnectivity to L2 networks.

VPLS module 36 may execute Label Distribution Protocol (LDP) 40A- and/or Border Gateway Protocol (BGP) 40B-based techniques to perform auto-discovery and signaling. Additional details regarding establishing a VPLS using BGP are found in "Virtual Private LAN Service (VPLS) Using Border Gateway Protocol (BGP) for Auto-Discovery and Signaling," Request for Comments: 4761, Network Working Group (Kompella and Rekhter, ed.), January 2007, which is incorporated by reference as if fully set forth herein. Additional details regarding establishing a VPLS using LDP are found in "Virtual Private LAN Service (VPLS) Using Label Distribution Protocol (LDP) Signaling," Request for Comments: 4762, Network Working Group (Lasserre and Kompella, ed.), January 2007, which is incorporated by reference as if fully set forth herein.

Data plane 32B includes one or more forwarding units, such as packet forwarding engines ("PFEs"), that provides high-speed forwarding of network traffic received by interface cards 48 via inbound links 50A-50N to outbound links 52A-52N. Integrated routing and bridging interface 60 ("IRB interface 60") processes and forwards network traffic received on an attachment circuit associated with the IRB interface. An administrator configures IRB interface 60 via management interface 33 to include VPLS instance 62 (an example of a bridging or switching instance) and to map routing interface 66 of the IRB interface to one of routing instance 68 for PE router 28. Routing interface 66 may represent a next hop or other reference of a logical interface (IFL) of IRB interface 60, for example. In some embodiments, aspects of data plane 32B are distributed to a number of distributed forwarding units, such as packet forwarding engines, each associated with a different one or more IFCs 48. In these embodiments, IRB interface 60 may be may be distributed to the distributed forwarding units to enable high-speed integrated routing and bridging within the data plane.

Router 28 implements VPLS instance 62 of IRB interface 60 to operate as a virtual switch or virtual bridge to interconnect multiple customer networks over a provider network, or to connect spokes and hub links of an H-VPLS instance. VPLS instance 62 performs L2 learning, that is, VPLS layer 62 "learns" customer device L2 addresses (hereinafter, "MAC addresses") from inbound service links (e.g., pseudowires) and inbound attachment circuit interfaces and associates those customer MAC addresses with corresponding outbound service links and outbound attachment circuit interfaces. VPLS instance 62 includes MAC table 64 that maps learned L2 addresses to outbound interfaces of IFCs 48 or to service links over the provider network for the VPLS instance. In addition, MAC table 64 stores gateway MAC addresses for VPLS instance 62 that map to routing interface 66, which maps to one of routing instances 68. In this respect, such gateway MAC addresses map to the routing instance. In some instances, IRB interface 60 may store gateway MAC addresses separately from MAC table 64. MAC table 64 is an associative data structure and may be stored within content-addressable memory (CAM), ternary CAM (TCAM), or another medium. In some instances, a flag set for MAC table entries having gateway MAC addresses for VPLS instance 62 indicates the respective gateway MAC address is mapped to the routing instance. While described herein as implementing a VPLS instance, VPLS instance 62 may implement any L2VPN service instance that offers a L2 emulation service to a L2 networks and use the described techniques to exchange gateway L2 addresses of routers that implement the L2 emulation service.

IRB interface 60 represents components of data plane 32B to implement the functionality provided by the interface. That is, IRB interface 60 represents hardware or a combination of hardware and software to implement virtual switching and other VPLS-related functionality for VPLS instance 62 as well as for performing integrated routing and bridging according to techniques of this disclosure.

Control plane 32A further includes synchronization module 38 (illustrated as "synch. module 38") that executes a distribution protocol to exchange gateway MAC addresses with other PE routers that participate in the VPLS instance implemented in part by VPLS instance 62. Synchronization module 38 identifies a MAC address for router 28 for the VPLS instance, e.g., a MAC address for the one of inbound interfaces 50 that carries an attachment circuit for the VPLS instance. Synchronization module 38 then generates synchronization messages that include the MAC address and sends the synchronization messages to other PE routers of the VPLS instance known to VPLS module 36 due to, for example, configuration or auto-discovery. That is, synchronization module 38 may query VPLS module 36 to identify network addresses other PE routers that are members of the VPLS instance.

In the illustrated example, synchronization module 38 generates synchronization messages as a BGP UPDATE message for BGP 40B that is modified to carry the MAC address for the VPLS instance, or as an LDP message for LDP 40A that is modified to carry the MAC address for the VPLS instance. The modified BGP UPDATE messages may carry the MAC address in a new Address Family Identifier (AFI) or Subsequent AFI (SAFI) of the Network Layer Reachability Information (NLRI), for example. As another example, an LDP message may carry the MAC address for the VPLS instance in an extended LDP message type that includes a type-length-value (TLV) object having a value set to the MAC address. In various instances, synchronization module 38 may use any suitable protocol for exchanging MAC addresses of PE routers that participate in a L2VPN service in accordance with techniques of this disclosure.

Synchronization module 38 additionally receives remote gateway MAC addresses for other PE routers participating in the VPLS instance in received synchronization messages. Upon receiving a remote gateway MAC address, synchronization module 38 installs the remote gateway MAC address to MAC table 64 using installation control message 39 sent to IRB interface 60. IRB interface 60 maps the remote gateway MAC address to routing interface 66. MAC table 64 further includes a MAC address for router 28 for VPLS instance 62, which also mapped to routing interface 66.

IRB interface 60 classifies L2 PDUs received on an attachment circuit associated with VPLS instance 62 and destined for one of the gateway MAC addresses of MAC table 64 as L3 packets for routing using the one of routing instances 68 mapped to routing interface 66. In other words, when router 28 receives an L2 PDU on an attachment circuit associated with VPLS instance 62, IRB interface 60 determines the destination MAC address of the L2 PDU. When the destination MAC address matches one of the gateway MAC addresses of MAC table 64 mapped to routing interface 66, IRB interface 60 classifies the L2 PDU as an L3 packet and provides the L2 PDU to the mapped one of routing instances 68 for L3 forwarding by data plane 32B. IRB interface 60 may decapsulate the L2 PDU of the L2 header and footer. When a destination MAC address of an L2 PDU does not match one of the gateway MAC address of MAC table 64, VPLS instance 62 switches the L2 PDU using standard VPLS switching techniques. In some instances, IRB interface 60 stores gateway MAC addresses for VPLS instance 62 separately from MAC table 64, performs a prior logical operation to classify L2 PDU as either routing traffic or bridging traffic, and then bridges the traffic or provides the traffic to a routing interface based on the result of classification.

By receiving and mapping remote gateway MAC addresses for a VPLS instance to one of routing instances 68 in this manner, router 28 may provide continuous connectivity to the VPLS instance for hosts that migrate to a customer network served by router 28 and configured to use a remote gateway MAC address of a different router serving a separate customer network. As a result, the techniques may ameliorate an administrative task for migration and may also reduce traffic within the VPLS core network.

Figure 3:
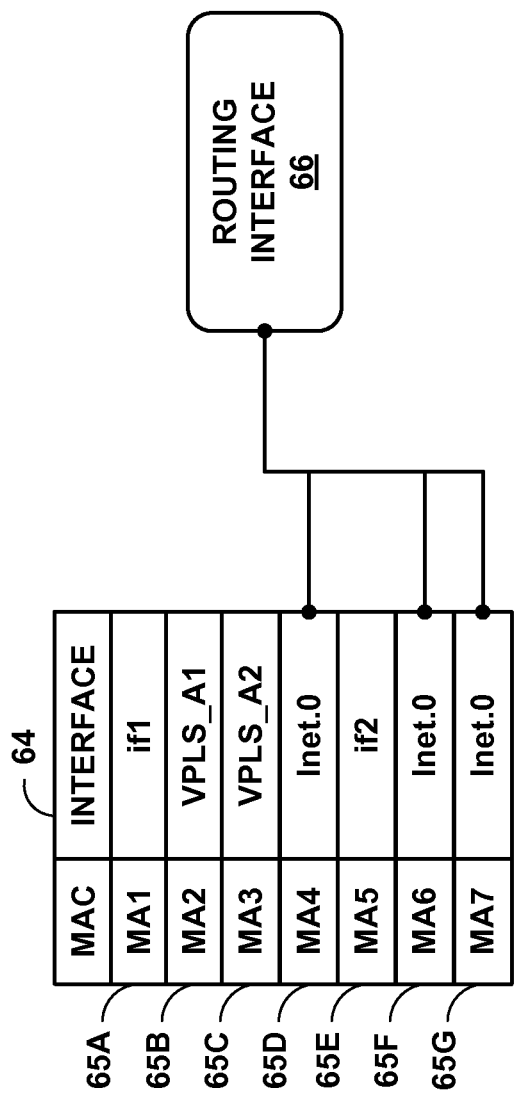
FIG. 3 is a block diagram illustrating an example instance of a MAC table that includes a plurality of gateway MAC addresses mapped to a routing interface of an integrated routing and bridging instance according to the techniques described herein.

FIG. 3 is a block diagram illustrating an example instance of MAC table 64 of FIG. 2 in detail. MAC table 64 includes MAC table entries 65A-65G ("MAC table entries 65") that each map an interface of router 28 to a MAC address. For example, MAC table entry 65A maps the local interface if1 to MAC address MA1. Local interfaces may represent a hardware interface, such as one of inbound interfaces 50 of router 28. Some of MAC table entries 65 map a service interface, such as a service link of VPLS instance 62 of router 28. For example, MAC table entry 64B maps service link interface VPLS_A1 to MA2. As router 28 performs MAC learning in the context of VPLS instance 62, VPLS instance 62 learns local and service interfaces for additional MAC addresses in the network and adds additional MAC entries to MAC table 64 to store the association for more efficient switching.

Still further MAC table entries 65 include respective MAC addresses that map to routing interface 66. In the illustrated example, MAC table entries 65D, 65F, and 65G map respective MAC address to the Inet.0 routing instance for router 28, where routing interface 66 is an interface, such as a next hop, reference, or pointer, to the Inet.0 routing instance. Routing interface 66 may represent a next hop of a logical interface of IRB interface 60, for example. In general, a next hop is a data structure that directs the manner in which packet forwarding units, such as PFEs, process a PDU. In accordance with techniques of this disclosure, each of the MAC addresses for MAC table entries 65D, 65F, and 65G is a gateway MAC address for a PE router that participates in the VPLS implemented in part by VPLS instance 62. Router 28 receives these gateway MAC addresses from the other PE routers, maps routing interface 66 to the received gateway MAC address in a new MAC table entry, and installs the new MAC table entry to MAC table 64. Thereafter, router 28 looks up received L2 PDU destination MAC addresses to identify a learned interface, if any, for the L2 PDU. Upon keying the L2 PDU destination MAC address to one of MAC table entries 65 that includes a gateway MAC address, e.g., MAC table entry 64D, router 28 sends the L2 PDU to the routing instance identified by routing interface 66 and routes the L3 packet therein in accordance with the routing interface.

In some instances, IRB 60 of router 28 stores and associates gateways MAC addresses for PE routers for VPLS instance 62 in a separate data structure. Upon receiving an L2 PDU, router 28 first keys the L2 PDU destination MAC address into the separate data structure to determine whether to send the L2 PDU to the routing instance identified by routing interface 66. If router 28 does not find the L2 PDU destination MAC address in the separate data structure, router 28 switches or broadcasts the L2 PDU based on whether the L2 PDU destination MAC address is present within MAC table 64.

Figure 4:
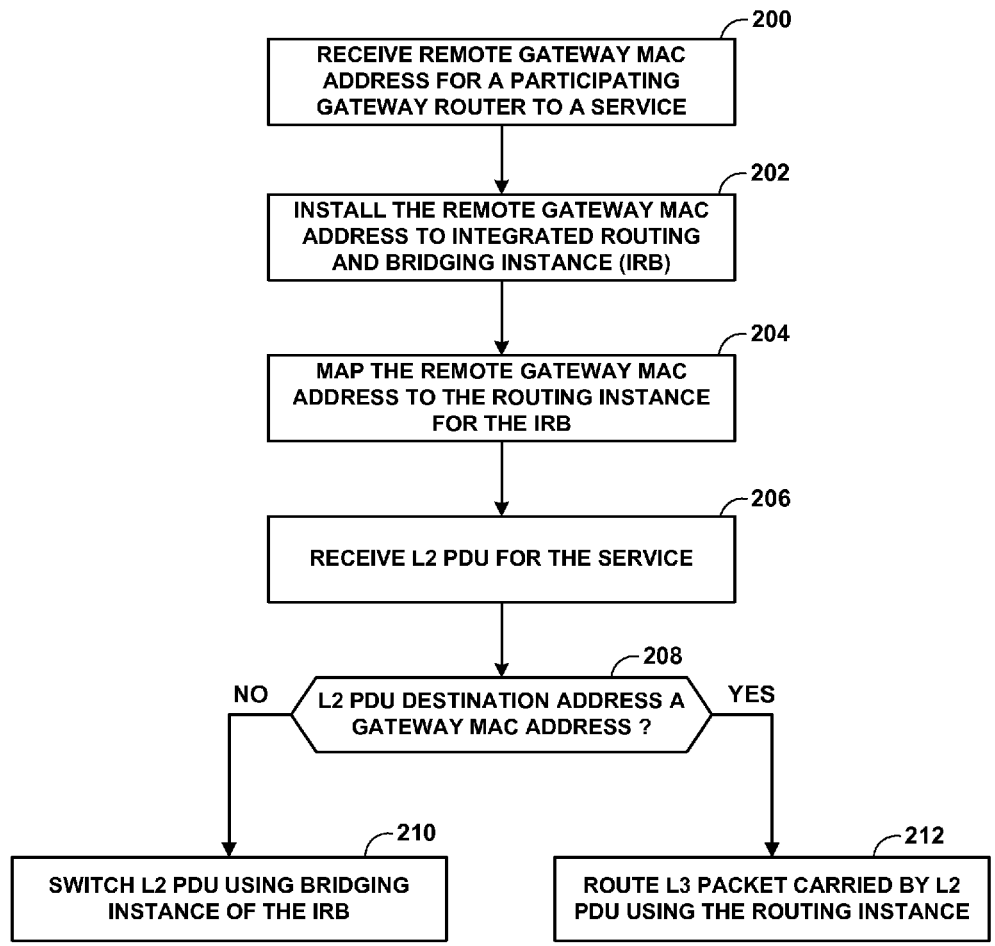
FIG. 4 is a flow chart illustrating an example mode of operation of a router to receive a remote gateway MAC address for a service and use the remote gateway MAC address to divert L2 PDUs received on an attachment circuit for the service to a routing instance in accordance with techniques described herein.

FIG. 4 is a flow chart illustrating an example mode of operation of router 28 of FIG. 2 to receive a remote gateway MAC address for a service and use the remote gateway MAC address to divert L2 PDUs received on an attachment circuit for the service to a routing instance. Initially, synchronization module 38 receives a remote gateway MAC address from another router that participates in a service, such as a VPLS instance (200). Synchronization module 38 installs the remote gateway MAC address to IRB interface 60 by sending installation control message 39 to data plane 32B (202), which maps the remote gateway MAC address to routing interface 66 of the IRB (204), an interface to one of routing instances 68. The terms "map" or "mapping," as used herein, may refer to any operation that modifies one or more data structures to associate at least two objects (e.g., addresses, interfaces, etc.) such that, provided a first object, the data structure specifies the association from the first object to the second object.

One of interface cards 48 subsequently receives an L2 PDU on an attachment circuit for the service that is run over one of inbound interfaces 50 (206). If the L2 PDU has a destination MAC address that matches a gateway MAC address, such as the remote gateway MAC address or the local gateway MAC for router 28 for the service (YES branch of 208), then IRB interface 60 sends the L2 PDU to routing interface 66 for L3 routing by the mapped routing instance (212). Otherwise (NO branch of 208), data plane 32B switches the L2 PDU using VPLS instance 62 of IRB interface 60.

Figure 5:
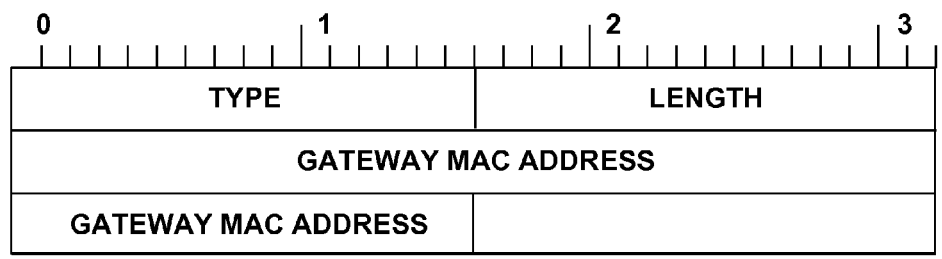
FIG. 5 is a block diagram illustrating an example of a synchronization message payload that carries a gateway MAC address in accordance with techniques of this disclosure.

FIG. 5 is a block diagram illustrating synchronization message payload 270, an example instance of a payload of synchronization message 24 of FIG. 2. For ease of illustration, a corresponding message header is not shown in FIG. 5. Synchronization message 24 in this example instance may be an extended LDP message that carries one or more MAC addresses within a TLV object represented by synchronization message payload 270. In other examples, the synchronization message may be an extended BGP message having a payload extended to specify the gateway MAC address.

In this example, the TLV is a triple <type, length, value> of variable length. The type is a 2-octet field that identifies one of the possible TLVs defined. Length is a 2-octet field that indicates the TLV value length. Value is of variable length and is encoded according to the TLV type. In one embodiment, a Type of 0 indicates that the TLV contains a 48-bit gateway MAC address that should be installed to an IRB interface of the receiving router as an additional gateway for the VPN service.

Various embodiments of the invention have been described. These and other embodiments are within the scope of the following claims.

The invention claimed is:

1. A method comprising:
    establishing, with a router, a layer two (L2) virtual private networking (L2VPN) instance to provide L2 connectivity between a local L2 network for the router and a remote L2 network for the router, wherein the router is addressable by a first gateway L2 address;
    receiving, with the router, a gateway L2 address synchronization message that specifies a second gateway L2 address for a remote router of the L2VPN instance, the second gateway L2 address different than the first gateway L2 address;
    receiving, with the router, a L2 PDU from the local L2 network on a service interface for the L2VPN instance; and
    extracting, with the router in response to determining the L2 PDU has an L2 destination address that matches the second gateway L2 address, a layer three (L3) packet carried by the L2 PDU and routing the L3 packet to an L3 network external to the L2VPN instance based on a destination L3 address of the L3 packet.

2. The method of claim 1, further comprising:
    switching, by the router in response to determining the L2 PDU has an L2 destination address that does not match the first gateway L2 address or the second gateway L2 address, the L2 PDU toward the remote L2 network on a service link for the L2VPN instance.

3. The method of claim 1, further comprising:
    mapping the second gateway L2 address to a routing instance for an integrated routing and bridging interface for the L2VPN instance; and
    routing the L2 PDU using the routing instance.

4. The method of claim 1, further comprising:
    executing a protocol with the router to receive the gateway L2 address synchronization message, wherein the protocol comprises one of a routing protocol and a distribution protocol.

5. The method of claim 1, wherein the gateway L2 address synchronization message comprises a first gateway L2 address synchronization message, the method further comprising:

sending, with the router, a second gateway L2 address synchronization message specifying the first gateway L2 address to the remote router.

6. The method of claim 1, wherein the L2VPN instance is a Virtual Private Local Area Network (LAN) Service (VPLS) instance, wherein the router couples to the local L2 network using an attachment circuit for the VPLS instance, the method further comprising:
receiving the L2 PDU with the router from the local L2 network on the attachment circuit.

7. The method of claim 6, further comprising:
mapping the second gateway L2 address to a routing instance for an integrated routing and bridging (IRB) interface, wherein a bridging instance for the IRB interface comprises the VPLS instance; and
routing the L2 PDU using the routing instance.

8. The method of claim 7, wherein the routing instance stores routes received by the router from a public network.

9. The method of claim 6, further comprising:
installing the second gateway L2 address to a Media Access Control (MAC) table for the VPLS instance.

10. The method of claim 1,
wherein the router comprises a first virtual router and the first gateway L2 address is a L2 address of the first virtual router,
wherein the remote router comprises a second virtual router and the second gateway L2 address is a L2 address of the second virtual router.

11. A router comprising:
a control unit comprising a processor;
an interface card;
a virtual private local area network (LAN) service (VPLS) module of the control unit that establishes a layer two (L2) virtual private networking (L2VPN) instance to provide L2 connectivity between a local L2 network for the router and a remote L2 network for the router, wherein the router is addressable by a first gateway L2;
a synchronization module of the control unit that receives a gateway L2 address synchronization message that specifies a second gateway L2 address for a remote router of the L2VPN instance, the second gateway L2 address different than the first gateway L2 address;
an integrated routing and bridging (IRB) interface that receives a L2 PDU from the local L2 network on an attachment circuit for the L2VPN instance attached to the interface card; and
a forwarding unit that extracts, in response to determining the L2 PDU has an L2 destination address that matches the second gateway L2 address, a layer three (L3) packet carried by the L2 PDU and routes the L3 packet to an L3 network external to the L2VPN instance based on a destination L3 address of the L3 packet.

12. The router of claim 11, wherein the L2VPN instance, in response to determining the L2 PDU has an L2 destination address that does not match the first gateway L2 address or the second gateway L2 address, switches the L2 PDU toward the remote L2 network on a service link.

13. The router of claim 11,
wherein the synchronization module maps the second gateway L2 address to a routing instance for the IRB interface, and
wherein the forwarding unit routes the L2 PDU using the routing instance.

14. The router of claim 13,
wherein the routing instance stores routes received by the router from a public network.

15. The router of claim 11,
wherein the synchronization module executes a protocol to receive the gateway L2 address synchronization message, wherein the protocol comprises one of a routing protocol and a distribution protocol.

16. The router of claim 11,
wherein the gateway L2 address synchronization message comprises a first gateway L2 address synchronization message, and
wherein the synchronization module sends a second gateway L2 address synchronization message specifying the first gateway L2 address to the remote router.

17. The router of claim 11,
wherein a bridging instance for the IRB interface comprises the L2VPN instance.

18. The router of claim 11,
wherein the L2VPN instance comprises a VPLS instance associated with a Media Access Control (MAC) table, and
wherein the synchronization module installs the second gateway L2 address to the MAC table and maps the second gateway L2 address to a routing instance.

19. The router of claim 11, wherein the router comprises a virtual router and the first gateway L2 address is a L2 address of the virtual router.

20. A non-transitory computer-readable medium comprising instructions for causing one or more programmable processors to:
establish, with a router, a layer two (L2) virtual private networking (L2VPN) instance to provide L2 connectivity between a local L2 network for the router and a remote L2 network for the router, wherein the router is addressable by a first gateway L2;
receive, with the router, a gateway L2 address synchronization message that specifies a second gateway L2 address for a remote router of the L2VPN instance, the second gateway L2 address different than the first gateway L2 address;
receive, with the router, a L2 PDU from the local L2 network on a service interface for the L2VPN instance; and
extract, with the router in response to determining the L2 PDU has an L2 destination address that matches the second gateway L2 address, a layer three (L3) packet carried by the L2 PDU and route the L3 packet to an L3 network external to the L2VPN instance based on a destination L3 address of the L3 packet.

21. The non-transitory computer-readable medium of claim 20, wherein the instructions cause the processors to:
send, with the router, a second gateway L2 address synchronization message specifying the first gateway L2 address to the remote router.

* * * * *